United States Patent Office 3,830,905
Patented Aug. 20, 1974

3,830,905
OXIDATION OF FERRIC CHLORIDE
Robert Dexter Rennick, Thousand Oaks, Calif., and Homer Charles Reed, Oklahoma City, Okla., assignors to Kerr-McGee Chemical Corp., Oklahoma City, Okla.
No Drawing. Filed Mar. 9, 1973, Ser. No. 339,508
Int. Cl. C01g 49/02; C01b 7/02
U.S. Cl. 423—633
15 Claims

ABSTRACT OF THE DISCLOSURE

This invention relates to a continuous process for the recovery of chlorine from iron chloride. More particularly, this invention relates to a continuous process wherein iron chloride is reacted with a mixture of an oxygen-containing gas and an oxide of nitrogen to produce iron oxide and gaseous chlorine.

BACKGROUND OF THE INVENTION

It is known that ferric chloride is produced as a by-product in the production of many products including titanium dioxide. In the titanium dioxide process, a titaniferous material such as rutile or ilmenite ore is chlorinated in the presence of a reducing agent, usually coke. Ferric chloride and titanium tetrachloride which are produced may be separated by various means such as, for example, distillation. In such process, when the ore is ilmenite, a substantial amount of iron chloride is produced. The economics of the titanium chlorination process make it desirable to recover the chlorine for recycle to the chlorinator.

It has been proposed (U.S. 1,552,786) to react iron chloride with oxygen in a combustion zone at a temperature of from 700° to 800° C. to permit recovery of chlorine and to produce a fine grained iron oxide. However, subsequent investigators have reported certain difficulties with such a method.

Specifically, it is reported that the reaction is slow and it is impractical to provide apparatus sufficiently large to permit the reaction to proceed to equilibrium within the combustion zone. When the reaction is incomplete, it necessarily follows that the discharge from the combustion zone will contain unreacted iron chloride and unreacted oxygen. Interaction of these two components downstream of the reaction zone results in incrustations of iron oxide material on the internal surfaces of the reactor: See Sawyer U.S. Pat. No. 2,642,339 (1953) and Nelson et al., U.S. Pat. No. 3,092,456 (1963).

In U.S. 2,642,339 it is proposed to react iron chloride with an oxygen-containing gas at a temperature of from 400° C. to 900° C. in the presence of a fluidized suspension of catalytic iron oxide particles. The patent discloses that approximately 62% conversion of iron chloride to iron oxide is obtained in about 6 seconds.

It also has been proposed (U.S. 3,340,007) to react ferric chloride with nitrogen dioxide, at a temperature of from about 285° C. to 420° C., to produce a mixture of iron oxides and oxychlorides of ultra-fine particle size. However, such a mixture requires further treatment to convert the oxychlorides to iron oxide and gaseous chlorine, such as, for example, calcining the mixture at a temperature of about 900° C.

In addition to the economic desirability of recovering the valuable chlorine from iron chloride, the iron chloride presents a waste disposal problem. Heretofore it has been customary to dispose of the iron chloride by dissolving it in water followed by neutralization with a base such as lime.

Obviously, a method of recovering the chlorine from such waste material and simultaneously converting the waste material to a saleable product is desirable.

SUMMARY OF THE INVENTION

A process now has been discovered for converting iron chloride to a saleable iron oxide and recovering the chlorine. The process comprises contacting iron chloride with a mixture of an oxygen-containing gas and an oxide of nitrogen at a temperature of up to about 485° C. to form gaseous chlorine and iron oxide, substantially free of ferric oxychlorides.

In a preferred embodiment the process comprises contacting a vaporous iron chloride with a mixture of an oxygen-containing gas and an oxide of nitrogen at a temperature of from about 335° C. to about 485° C. to form chlorine and pigmentary iron oxide, substantially free of ferric oxychlorides. The iron oxide thus produced is characterized by having an average particle size of less than two microns and an oil absorption greater than 10 grams of oil per hundred grams of pigment.

DESCRIPTION OF PREFERRED EMBODIMENT

The present invention comprises a process for converting iron chloride to iron oxide and recovering gaseous chlorine. The term iron chloride as used herein includes such forms of chlorine as $Fe_2Cl_6$, $FeCl_2$, $FeCl_3$ and iron oxychloride. The iron chloride may contain impurities including other metal chlorides.

However, when it is desired to use the iron oxide product as a pigment, it is advantageous that the iron chloride be substantially pure. By substantially pure, it is meant that the iron chloride should consist of about 95% ferric chloride and contain less than 2% of other metallic chlorides that would tend to affect the color of the end product when oxidized. Examples of such metallic chlorides include manganese, nickel and copper chlorides. However, the iron chloride may contain up to 10% of colorless metallic chlorides such as aluminum, zirconium, niobium or zinc, or inorganic substances such as silica and the like.

The iron oxide produced in accordance with the instant invention is substantially free of oxychloride i.e. less than 10% by weight. The iron oxide is suitable for sale as a feed stock for an open hearth or blast furnace to produce iron. Further, in accordance with a preferred embodiment the iron oxide is suitable for use as pigment without need of further treatment, such as grinding, calcining and the like.

The use of iron oxides as color pigments is well known. The preferred oxides are the synthetic iron oxides which are generally made by one of three processes, namely, (a) by calcination of ferrous sulfate, (b) by reaction of an aqueous solution of ferrous sulfate with a base to precipitate a yellow high grade ferric oxide which is subsequently calcined to produce red $Fe_2O_3$ and (c) by direct precipitation from a solution of ferrous sulfate.

Such synthetic iron oxides generally contain more than 95% $Fe_2O_3$, are low in impurities and are characterized by clear, brilliant permanent color, fine particle size, easy wetting and very good hiding power. To be suitable for use as a pigment, the iron oxide must have an average particle size of less than two microns and be capable of absorbing at least 10 grams of oil per hundred grams pigment.

The process of the instant invention is particularly applicable to iron chloride formed as a by-product in the chlorination of a titaniferous ore such as, for example, ilmenite or rutile ore.

According to the present invention, the iron chloride is reacted with a mixture of an oxygen-containing gas and an oxide of nitrogen. The oxygen-containing gases contemplated herein are well known to those versed in the art and include air, molecular oxygen or oxygen enriched air and the like. Advantageously, substantially pure oxygen is used to reduce the dilution of the chlorine produced during the reaction.

The oxides of nitrogen suitable for use in the present invention are those oxides having an oxidation state of plus 2 or greater and include $NO_2$, $N_2O_4$, NO and the like. Obviously, of course, the oxide of nitrogen may be in the form of an oxyhalide such as, for example, NOCl or any other compositions which will react with the oxygen to form $NO_2$. Further, the oxides of nitrogen may be in a gaseous or liquid phase.

The ratio of oxygen-containing gas to oxide of nitrogen is critical. It is essential that the mixture contain at least 1 part oxide of nitrogen to 50 parts oxygen. The ratio of oxide of nitrogen may be in excess of 12:1. However, for economic reasons, it generally is preferred to maintain such ratio within the range of from about 1:50 to 12:1. Particularly good results are obtained when the ratio of an oxide of nitrogen such as, for example, $NO_2$ to oxygen is within the range of from about 1:10 to 1:1.

The mixture of oxygen-containing and oxide of nitrogen should contain an excess of the stoichiometric amount of oxygen required to completely oxidize all of the iron chloride to iron oxide. As those versed in the art will appreciate, each mole of $NO_2$ will contribute only one half mole of oxygen to the reaction.

Generally, there is provided sufficient oxygen-containing gas to provide from about one to four times the stoichiometric requirements of oxygen for complete oxidation of all the iron chloride, viz., from about 1.5 to 6 moles of oxygen per mole of iron chloride ($Fe_2Cl_6$) to be oxidized. Obviously, of course, if the iron chloride is introduced in the form of $FeCl_3$ the molar requirements of oxygen are reduced by a factor of one half, viz., 0.75 to 3 moles of oxygen for each mole of $FeCl_3$. Preferably, the oxygen-containing gas is present in an amount sufficient to provide from 1.5 to 2.5 times the stoichiometric requirements of oxygen.

The mixture of oxygen-containing gas and oxide of nitrogen are contacted with iron chloride at a temperature of up to about 485° C. A preferred temperature range is from about 200° C. to about 300° C. When a pigmentary iron oxide product is desired the temperature is preferably within the range of from about 335° C. to 485° C.

It will be appreciated by those skilled in the art that the specific temperature selected is not critical, that is, a lower temperature will result in a slower reaction whereas a higher temperature, while producing a more rapid reaction, will require that the apparatus utilized be constructed of a material capable of withstanding such temperatures. Further, as those versed in the art will appreciate, higher temperatures increase the disassociation rate of $NO_2$, thus, increasing the amount of $NO_2$ required.

Particularly good results have been obtained at a temperature of about 350° C. At such temperature it has been found that the reaction is substantially complete in from about 0.05 to 5 seconds and the product iron oxide has excellent pigmentary properties.

In accordance with the process of the instant invention, the iron chloride may be in a solid, liquid or vapor phase depending upon the particular reaction temperature selected.

More particularly at temperatures of from below about 20° up to about 304° C. the iron chloride is a solid phase. At such temperatures the iron chloride in particulate form is oxidized by contacting it with a gaseous mixture of oxygen-containing gas and oxide of nitrogen. Obviously, the apparatus utilized is not critical. The particulate iron chloride may be continuously oxidized by passing it through, for example, a rotary kiln in contact with a counter-current flow of the gaseous mixture of oxidant. Alternatively, the iron chloride is placed in a closed container and the gaseous mixture of oxidants is continuously introduced into the bottom of the container until substantially all of the ferric chloride has reacted with the oxygen to form iron oxide. The gaseous reaction products are, of course, recovered from the top of the container.

It will be apparent to those versed in the art that there are many methods of conducting the process of the present invention, viz., batch or continuous operations with the iron chloride in a vapor, liquid or solid phase.

It has been discovered that the reaction is substantially complete at temperatures of from near ambient to about 485° C. Such a discovery is surprising since the prior art teaches that the use of either an oxygen-containing gas or an oxide of nitrogen alone to oxidize ferric chloride, at such temperatures, results in an end product containing oxychlorides and unreacted starting materials.

The exact reaction taking place is not fully understood and the inventors do not wish to be bound by any particular theory. However, it is believed that in some manner the oxide of nitrogen acts as a catalyst for the iron chloride-oxygen reaction.

In accordance with the instant invention the iron chloride and a mixture of oxygen-containing gas and an oxide of nitrogen react to form iron oxide and product gases including gaseous chlorine. The gaseous chlorine is recovered by conventional methods and utilized, for example, to chlorinate titaniferous ore. The product gas will, of course, contain the excess oxygen-containing gas and oxides of nitrogen along with minor amounts of NOCl as well as gaseous chlorine.

Methods are known, separate from this invention, for recovering the chlorine from the other gaseous products. An example of such a method includes cooling the gases to a liquid state and separating them into their component parts by fractional distillation.

In accordance with a preferred embodiment the iron oxide produced is suitable for use as a pigment without further treatment. Iron oxide produced in accordance with a preferred embodiment of the present invention has an average particle size of less than about 2 microns. Indeed, in accordance with the present invention it is possible to produce iron oxide having an average particle size of from about 0.01 to 0.5 microns. Further, it has been found that iron oxide so produced has an oil absorption ratio of from about 20 to 40 grams oil/hundred grams iron oxide.

When a pigmentary iron oxide product is desired, it is advantageous to use an elongated flow-through reactor of the type used in the titanium dioxide pigment industry. In such reactors, vapor phase reactants are introduced into the reactor at a sufficiently high velocity to provide adequate mixing of the reactants for a desired reaction time. Examples of such reactors and techniques are disclosed in U.S. Pat. Nos. 3,512,219 and 3,361,525, said patents being incorporated herein by reference.

The preferred technique and apparatus are set forth in U.S. Pat. No. 3,512,219. More particularly, it is preferred to use a metal walled reactor having external cooling whereby the inside surface of the reactor wall is maintained relatively cool. Further, as more fully taught in said patent, sand advantageously is introduced into the reactor to substantially prevent any accumulation of iron oxide on the wall of the reactor. In accordance with the present invention it is possible to obtain pigmentary iron oxide at a temperature of from about 335° to 485° C., thus, the material selected for the reactor construction is not as critical as when the reactor is to be used for the oxidation of titanium tetrachloride.

When pigmentary iron oxide is desired, the reactants are introduced into the reaction at such a flow rate as to provide a total retention time in the reaction zone of the reactor of from about 0.01 to 10 seconds. As those versed in the art will appreciate the optimum reaction time will depend upon many variables such as, for example, the configuration of the reactor, reaction temperature, stoichiometry of the reactants and the like. Obviously, of course, the reaction time must be sufficient for substantially complete oxidation of all the fabric chloride. Further, the reaction time must not be so long as to permit the product iron oxide particles to grow beyond the desired size. In accordance with the present invention such reaction time generally is within the range of from about 0.01 to 5 seconds and preferably from about 0.01 to 2 seconds.

The following examples are set forth for the purpose of illustrating various modes of practicing the present invention. Other obvious equivalents will be apparent to those versed in the art.

EXAMPLE I

Ten grams of ferric chloride ($Fe_2Cl_6$) are placed in a ceramic boat. The boat then is placed in a tube furnace maintained at a temperature of 180° C. A mixture of an oxygen-containing gas and oxide of nitrogen (10 parts oxygen to 1 part $NO_2$) is introduced slowly into the furnace and the product gases recovered. After an amount of gas sufficient to provide a 30% excess of the stoichiometric requirements of oxygen has been introduced, the boat is removed and the contents analyzed. The results of the analysis show that the contents are substantially pure iron oxide and contain less than 0.1% by weight residual chloride.

The foregoing procedure is repeated except that the furnace temperature is maintained at about 350° C. and the mixture of oxygen-containing gas and oxide of nitrogen are introduced rapidly in an amount sufficient to provide a 20% excess of the stoichiometric requirements of oxygen. Thereafter, the boat is removed, the contents analyzed and found to contain less than 0.3% residual chloride. The foregoing example clearly demonstrates the efficacy of the present invention for the recovery of chlorine from iron chloride.

EXAMPLE II

Ten grams of ferric chloride are placed in a ceramic boat and the boat is placed in a furnace. The furnace is adjusted to maintain a temperature of 280° C. A stream of pure oxygen is passed through the furnace and no oxide of nitrogen is present. After sufficient oxygen to provide about 10 times the stoichiometric requirements has been introduced the sample is removed and analyzed. The analysis shows that only 60% of the chlorine has been removed, thus, demonstrating that the use of oxygen alone is not an effective method of recovering the chlorine.

EXAMPLE III

The procedure of Example II is repeated except that the furnace temperature is maintained at 320° C. and a gaseous stream consisting only of oxides of nitrogen is introduced into the furnace. The oxides of nitrogen are introduced in an equal molar ratio of $NO_2$ and $NO$. The gas is introduced over a period of about 47 hours and in an amount sufficient to provide about 100 times the stoichiometric requirements. Thereafter, the boat is removed and analysis of the contents reveals that the contents are substantially all in the form of FeOCl which represents a 67% recovery of the chlorine. Thus, this example clearly demonstrates that in the absence of oxygen a substantial amount of chlorine is not recovered.

EXAMPLE IV

Ferric chloride vapor and a mixture of an oxygen-containing gas and oxide of nitrogen are simultaneously introduced into a heated tube. The temperature of the tube is maintained at about 485° C. and the mixture of oxygen-containing gas and oxide of nitrogen and introduced in an amount sufficient to provide about twice the stoichiometric requirements of oxygen. The reactants are introduced at a rate sufficient to provide a residence time in the tube of about ½ minute. The reaction products (both gaseous and solids) exiting from the other end of the tube are recovered. The solid reaction products are analyzed and found to be substantially pure iron oxide containing less than 1% residual chloride.

The foregoing example is repeated except that the tube is maintained at a temperature of 320° C. and the residence time of the reactants is about 1 minute. The solid reaction products are recovered, analyzed and found to contain about 1.5% residual chloride.

EXAMPLE V

Ferric chloride is added to an excess of liquid $N_2O_4$ (at a temperature of about 20° C.) with no apparent reaction. Oxygen slowly is blown through the slurry. Chlorine and traces of NOCl evolve from the slurry. After a slight excess of stoichiometric amounts of oxygen is introduced, the slurry is warmed to evaporate $NO_2$ leaving a solid reaction product. The solid reaction product then is warmed to evolve any absorbed vapors. Analysis of the remaining solids shows that the residual chloride content is less than 10%, thus, demonstrating the applicability of the present invention to a liquid phase reaction.

EXAMPLE VI

Ferric chloride is slurried in carbon tetrachloride. A mixture of an oxygen-containing gas and oxide of nitrogen, containing 50 parts of $O_2$ to 1 part $NO_2$, then is sparged through the slurry. After a sufficient quantity of the mixture has been sparged through the slurry to provide a several fold excess of the stoichiometric requirements of oxygen (over a period of about 1 hour), the slurry is filtered and the solids recovered for analysis. Analysis of the solids reveals them to be substantially pure iron oxide containing less than 7% residual chloride.

EXAMPLE VII

In accordance with a preferred embodiment, an anhydrous iron chloride is oxidized in accordance with the instant invention by introduction into a reactor vessel. The reactor vessel is an elongated tube having two inlets on one end thereof and an open outlet at the other end. The vaporous iron chloride, in the form of $Fe_2Cl_6$ is continuously introduced into the reactor in a gaseous stream comprising 0.45 moles helium, 0.10 moles $Fe_2Cl_6$ and 0.12 moles chlorine per minute. The purpose of the helium and chlorine is to act as an inert carrier for the $Fe_2Cl_6$ vapor.

A second gaseous stream comprising 0.58 moles per minute oxygen and 0.54 moles per minute $NO_2$ is introduced into the reactor through the other inlet. The average retention time of the reactants in the reactor vessel is about 0.04 seconds. The reactor is externally heated to maintain a reaction temperature of approximately 475° C. The solid reaction products are recovered from the reactor outlet, analyzed and found to be substantially pure (about 99%) iron oxide. The iron oxide product is warmed under vacuum to remove any entrained gases and the resulting particles are light brown solids, having an average particle size of about 0.07 microns, and are suitable for use as a pigment without need of further treatment.

EXAMPLE VIII

The procedure of Example VII is repeated with the following exceptions. The vaporous iron chloride is introduced into the reactor in a gaseous stream comprising 0.59 moles helium, 0.08 moles $Fe_2Cl_6$ and 0.06 moles chlorine. The second gaseous stream comprises 0.24 moles of oxygen and 0.24 moles of $NO_2$. The average retention time of the reactants in the reactor is about 0.02 seconds and the reaction temperature is maintained at approximately 380° C.

The solid reaction products are recovered from the reactor outlet, analyzed and found to be substantially pure particulate iron oxide. The iron oxide product is warmed under vacuum to remove any entrained gases and the resulting particles are light brown in color having an average particle size of from about 0.01 to 0.06 microns. The product iron oxide has an oil absorption ratio of about 40 grams oil per hundred grams iron oxide and is suitable for use as a pigment without need of subsequent treatment.

EXAMPLE IX

The procedure of Example VII again is repeated with the following exceptions. The vaporous iron chloride is continually introduced into the reaction in a gaseous stream comprising 0.54 moles of nitrogen, 0.12 moles of chlorine and 0.12 moles $Fe_2Cl_6$. The gaseous stream introduced through the other inlet of the reactor comprises 0.65 moles of oxygen and 0.20 moles $NO_2$. The average retention time of the reactants in the reactor vessel is about 0.8 seconds and the reaction temperature is maintained at about 425° C.

The product iron oxide particles are recovered and warmed under vacuum to remove any entrained gases. The resulting particles are dark brown in color and substantially all the particles have a size within the range of from about 0.10 to 0.15 microns. Further, the particles have an oil absorption ratio in excess of 20 grams oil per hundred grams iron oxide and are suitable for use as a pigment without further treatment.

EXAMPLE X

The procedure of Example I again is repeated with the following exceptions. Vaporous iron chloride is introduced into the reactor in a gaseous stream comprising 0.36 moles of nitrogen, 0.05 moles of chlorine and 0.14 moles $Fe_2Cl_6$. The second gaseous stream introduced into the reactor comprises 0.55 moles oxygen and 0.08 moles $NO_2$. The retention time of the reactants in the reactor is about 0.3 seconds and the reaction temperature is maintained at about 325° C.

The iron oxide product is recovered, washed with water and dried by warming. The dried particles are dark red in color having a particle size of from about 0.08 to 1.15 microns and are suitable for use as a pigment without further treatment.

The foregoing description and examples are set forth for the purpose of illustrating the present invention and should not be considered as limiting the scope thereof; reference being had to the appended claims for such purpose.

What is claimed is:

1. A process comprising reacting at a temperature of up to about 485° C., a mixture of an oxygen-containing gas and an oxide of nitrogen with iron chloride to form iron oxide and chlorine, and recovering said reaction products, said mixture of oxygen-containing gas and oxide of nitrogen being present in an amount sufficient to provide, (a) an excess of the stoichiometric requirements of oxygen for oxidation of the iron chloride to iron oxide and (b) an oxide of nitrogen to oxygen ratio within the range of from about 1:50 to 12:1.

2. The process of claim 1 wherein the temperature is within the range of from about 200 to 300° C.

3. The process of claim 1 wherein said oxygen-containing gas is substantially pure oxygen.

4. The process of claim 1 wherein said oxygen-containing gas is present in an amount sufficient to provide from about 1.5 to 2.5 times the stoichiometric requirements of oxygen for complete oxidation of the ferric chloride.

5. The process of claim 1 wherein the temperature is sufficiently low to form a slurry of iron chloride in particulate form in a liquid phase oxide of nitrogen and the oxygen-containing gas is introduced into the slurry.

6. The process of claim 1 wherein the temperature is sufficiently low to form a slurry of iron chloride in carbon tetrachloride and the mixture of an oxygen-containing gas and oxide of nitrogen are introduced into the slurry.

7. A vapor phase process comprising reacting at a temperature of from about 335° C. to about 485° C. and a time within the range of from about 0.01 to 10 seconds, a mixture of an oxygen-containing gas and an oxide of nitrogen with vaporous iron chloride to form solid pigmentary iron oxide and chlorine, and recovering said reaction products, said mixture of oxygen-containing gas and oxide of nitrogen being present in an amount sufficient to provide, (a) an excess of the stoichiometric requirements of oxygen for oxidation of the iron chloride to iron oxide and (b) an oxide of nitrogen to oxygen ratio within the range of from about 1:50 to 12:1.

8. The process of claim 7 wherein the temperature is about 350° C.

9. The process of claim 7 wherein said oxygen-containing gas is substantially pure oxygen.

10. The process of claim 7 wherein said oxygen-containing gas is present in an amount sufficient to provide from about 1.5 to 2 times the stoichiometric requirements of oxygen.

11. The process of claim 7 wherein the oxygen-containing gas is substantially pure oxygen and the oxide of nitrogen is nitrogen dioxide.

12. The process of claim 7 wherein said mixture contains an amount of oxygen-containing gas and oxide of nitrogen sufficient to provide a ratio of oxide of nitrogen to oxygen within the range of from about 1:10 to 1:1 and the oxygen-containing gas is present in amount sufficient to provide from about 1.5 to 2 times the stoichiometric requirements of oxygen.

13. The process of claim 12 wherein the oxygen-containing gas is substantially pure oxygen and the oxide of nitrogen is nitrogen dioxide.

14. The process of claim 13 wherein the temperature is about 350° C.

15. The process of claim 14 wherein the oxygen and nitrogen dioxide are reacted with iron chloride for a time within the range of from about 0.01 to 5 seconds.

References Cited
UNITED STATES PATENTS

| | | | |
|---|---|---|---|
| 3,451,776 | 6/1969 | Van Dijk et al. | 423—502 |
| 3,772,425 | 11/1973 | Kang et al. | 423—502 |

OSCAR R. VERTIZ, Primary Examiner

B. E. HEARN, Assistant Examiner

U.S. Cl. X.R.
106—304; 423—502

UNITED STATES PATENT OFFICE
CERTIFICATE OF CORRECTION

Patent No. 3,830,905　　　　　　　　Dated August 20, 1974

Inventor(s) Robbert Rennick and Homer Reed

It is certified that error appears in the above-identified patent and that said Letters Patent are hereby corrected as shown below:

Column 3, line 18, after "oxygen-containing", insert -- gas --.

Column 4, line 75, "fabric" should read -- ferric --.

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents